United States Patent

[11] 3,628,022

[72] Inventor Harry J. Schulte, Jr.
Fair Haven, N.J.
[21] Appl. No. 864,663
[22] Filed Oct. 8, 1969
[45] Patented Dec. 14, 1971
[73] Assignee Bell Telephone Laboratories, Incorporated
Berkeley Heights, N.J.

[54] NONBLOCKING SELECTIVE SWITCHING SYSTEM FOR OPTICAL COMMUNICATION
16 Claims, 3 Drawing Figs.

[52] U.S. Cl. 250/199, 332/7.51
[51] Int. Cl. H04b 9/00
[50] Field of Search 250/199; 179/15 DC, 15 AL; 178/DIG. 2; 325/3, 5; 332/7.51

[56] References Cited
UNITED STATES PATENTS

| | | | |
|---|---|---|---|
| 2,599,368 | 6/1952 | Bruce et al. | 250/199 |
| 2,907,874 | 10/1959 | Halvorson | 325/3 |
| 3,401,469 | 9/1968 | Sharer et al. | 35/8 |

*Primary Examiner*—Robert L. Richardson
*Attorneys*—R. J. Guenther and Kenneth B. Hamlin

ABSTRACT: Carrier beams of coherent light are directed around a closed coupling loop having $n$ terminals coupled thereto by selective light deflectors which divert a different beam from the loop at each terminal. The loop includes $n \times n$ spatially dedicated beam paths. Each terminal modulates its carrier beam and directs the modulated beam by way of the terminal deflector to one of $n-1$ different paths in the loop for one of the $n-1$ other terminals. Likewise, the deflector at each terminal directs to its terminal the modulated carrier beams from the $n-1$ other terminals.

INVENTOR
H. J. SCHULTE, JR.
BY
Charles Scott Phelan
ATTORNEY

NONBLOCKING SELECTIVE SWITCHING SYSTEM FOR OPTICAL COMMUNICATION

BACKGROUND OF THE INVENTION

1. Field of the Invention

This invention relates to an optical switching system for interconnecting plural communication terminals in different selectable combinations.

2. Description of the Prior Art

Optical switching systems are known in the art and have generally been of the form in which beams of electromagnetic energy are directed between selectable terminals either by arrangements of mirrors or by electro-optic digital light deflectors. Electro-optic systems encounter several problems, such as system complexity when two-way communications are required, inability to send and receive at the same time so that a terminal performing either function is blocked with respect to the other, and the employment of incoherent light, which is relatively difficult to confine to narrow beam paths. Optical switching systems in which reflective devices are employed for directing light beams encounter problems which are similar to those enumerated for electro-optic systems, and they also often require a large room to accommodate the necessary optics.

STATEMENT OF THE INVENTION

An illustrative embodiment of the present invention presents a solution to the foregoing problems by utilizing $n \times n$ electromagnetic energy beam paths in a communication system employing $n$ terminals which are to be selectively interconnected by electromagnetic energy beams. A selective beam deflector is provided at each of the terminals for directing individual electromagnetic energy beams thereto.

It is one feature of the invention that the $n \times n$ beam paths are provided in a closed loop in which the cross-sectional projections of the $n \times n$ beams form a square array of $n$ rows and $n$ columns of beam path locations.

It is a further feature of the invention that the beam deflectors are selective reflectors arranged at each terminal on the loop to permit $n$ incoming beams (one carrier and $n-1$ modulated carriers from other terminals) to be directed from the loop to the terminal apparatus and which further permit $n-1$ outgoing modulated carrier beams to other terminals to be inserted into appropriate loop locations without interfering with the remaining $n^2-n-(n-1)$ outgoing paths.

DESCRIPTION OF THE DRAWING

A more complete understanding of the present invention may be derived from the following detailed description when taken in connection with the appended claims and the attached drawing in which:

DETAILED DESCRIPTION

The present invention is described in terms of a communication terminal interconnection system in which the electromagnetic energy beams utilized for establishing selectable coupling links among the terminals are beams of coherent light. These beams are transmitted in selectable spatially dedicated paths wherein $n \times n$ paths are provided for an $n$-terminal system. Each terminal has $n$ incoming paths, one of which is utilized for supplying an unmodulated carrier beam to the terminal and $n-1$ additional incoming paths for providing unique receiving connections from each of the $n-1$ other terminals in the system. In like manner, each terminal includes $n-1$ outgoing paths for discrete modulated light beams for transmitting to each of the $n-1$ other stations in the system.

Figures 1, 1A:
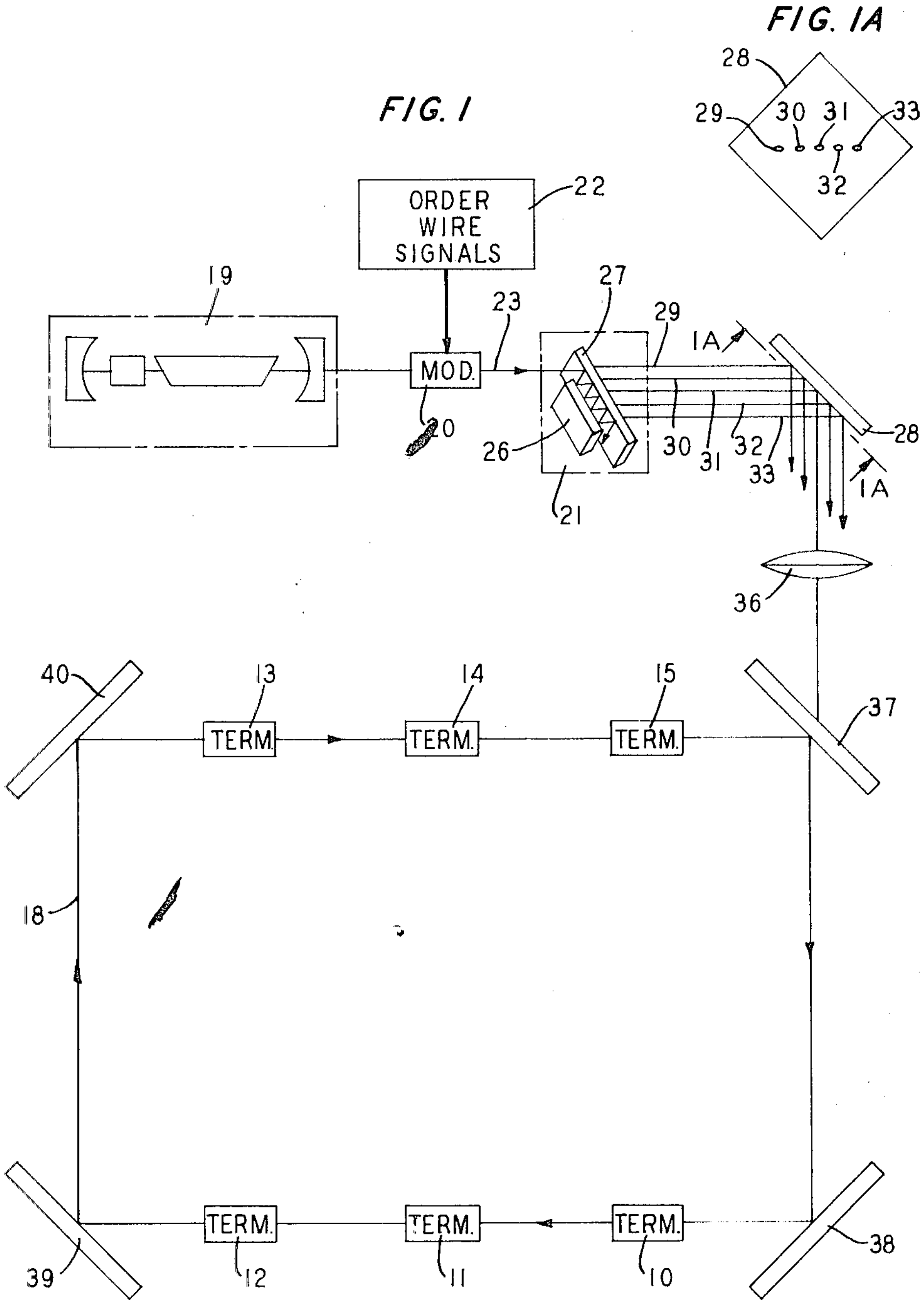
FIG. 1 is a simplified block and line diagram of a communication terminal interconnection system in accordance with the present invention.
FIG. 1A is a side view of a part of the system in FIG. 1.

In FIG. 1 a simplified system is shown including six terminals 10, 11, 12, 13, 14, and 15. These stations are, for convenience, arranged on opposite sides of a closed loop optical transmission path 18. Each terminal has interface apparatus, which will be described in connection with FIG. 2, for coupling one or more system users to the closed loop 18 for communication with users that are similarly coupled to other ones of the terminals. For example, in a communication system central office, it is sometimes desired to transfer a block of circuits from one trunk to another. In accordance with one aspect of the present invention, such a block of circuits would be collected at one of the terminals illustrated in FIG. 1 to be inserted into the loop 18 so that they might be picked off at another one of the terminals on the loop for connection to a different communication trunk. For example, a block of different video transmission channels can be switched on a single one of the modulated beam transmission paths which is included in the loop 18.

The light beams employed in the system of FIG. 1 are supplied by a pulsing laser source 19 which advantageously provides a train of coherent light pulses with a pulse repetition rate of 100 or more megahertz. Such sources are now well known in the art and do not require further description. The pulses are coupled through a modulator 20 to a beam divider 21. A central office type of application would advantageously be controlled by a central processor (not shown) which may, on occasion, have need to transmit order wire types of signals to all of the terminals 10–15. For this purpose, an order wire signal source 22 supplies modulating signals to the modulator 20 so that the light-pulse train conveys the same information to all terminals. In the absence of a need for transmitting such common signals, however, modulator 20 and the signal source 22 are inactive and the light-pulse train from laser source 19 passes directly to the beam divider 21.

The purpose of beam divider 21 is to break the pulsed light beam 23 into a plurality of beams, arranged in a particular pattern, which will comprise the carrier beams for active ones of the stations 10–15. The divider includes a pair of mirrors 26 and 27 which are arranged at an angle to the path of the beam 23 and across that path to produce multiple impingements upon the mirror 27 which are equal in number to the desired number of carrier beams. Thus, the beam 23 passes by the mirror 26 to strike the mirror 27 which is arranged parallel to mirror 26 and in close proximity thereto. Mirror 27 is only partially reflecting so that a portion of each beam impinging thereon from the direction of mirror 26 is transmitted through to a further mirror 28, and the remainder of the beam is reflected back to the mirror 26. The beam is thus repetitively reflected between the mirrors and loses a portion of its energy through mirror 27 each time.

In one embodiment, the mirror 27 was characterized by 2-percent transmission capability so that 2 percent of the energy of each incident beam was transmitted through the mirror 27. The multiple reflection process between mirrors 26 and 27 continues and produces a group of parallel output beams 29, 30, 31, 32, and 33. Only five such beams are illustrated in FIG. 1, in order to preserve the simplicity of the drawing and thereby facilitate the understanding of the invention. In accordance with a further aspect of the invention, the mirrors 26 and 27 are also canted at an angle to the plane of the drawing, as partially indicated in FIG. 1, so that the beams 29 through 33 impinge upon the mirror 28 along a diagonal of the rectangular configuration of that mirror. The diagonal distribution does not show in the representation of divider 21 but FIG. 1A does show it. FIG. 1A is a side view of mirror 28 taken along line A,A in FIG. 1 and shows the beam incidence locations for beams 29–33 along a diagonal of mirror 28.

Beams 29–33 are reflected from mirror 28 along parallel paths which are also parallel to the right-hand vertical edge of the loop 18 as illustrated in FIG. 1. These beams are passed through a beam-collimating lens 36. The injection of the beams into loop 18 is accomplished through a diagonal transparent strip (not shown) in an otherwise fully reflecting corner mirror 37 on the loop 18. Three additional mirrors 38 through 40, all fully reflecting, direct the beams 29–33 in their diagonal orientation around the loop 18 to their respective terminals.

Although the loop 18 is shown in FIG. 1 as a single line, it schematically represents a bundle of $n \times n$ beam transmission paths with a rectangular cross section of $n$ rows of paths and $n$ columns of paths. The beams 29–33 occupy the five paths along a diagonal of the row and column array. Thus, the system of FIG. 1 with five carrier beams actually accommodates only five active terminals in a system in which $n=5$, and the sixth terminal, e.g., terminal 15, illustrated in FIG. 1 is a dummy terminal which is provided for a reason to be subsequently discussed in connection with FIG. 2. Since five of the $n \times n$ beam paths in loop 18 are utilized for carrier beams, the $n^2-n$ remaining paths are available for modulated carrier beams for the respective terminals. Consequently, each of the five active terminals on the loop 18 has $n-1=4$ beam paths available to it for sending modulated signals to the other $n-1$ active terminals on the loop. Although terminals 10–15 in FIG. 1 are divided to have three on each of two opposite sides of rectangular loop 18, there is no aspect of the present invention which requires any particular loop configuration or any particular distribution of terminals on different parts of the loop. Consequently, terminals can be located on any of the four sides of the loop 18, and no symmetry of distribution is necessary.

All of the optics for loop 18 are conveniently provided on a single table top (not shown) so that it is comparatively easy to stabilize the entire loop against mechanical vibrations. Likewise, the loop represents a broadband switching system which is realizable with relatively small space requirements.

Figure 2:
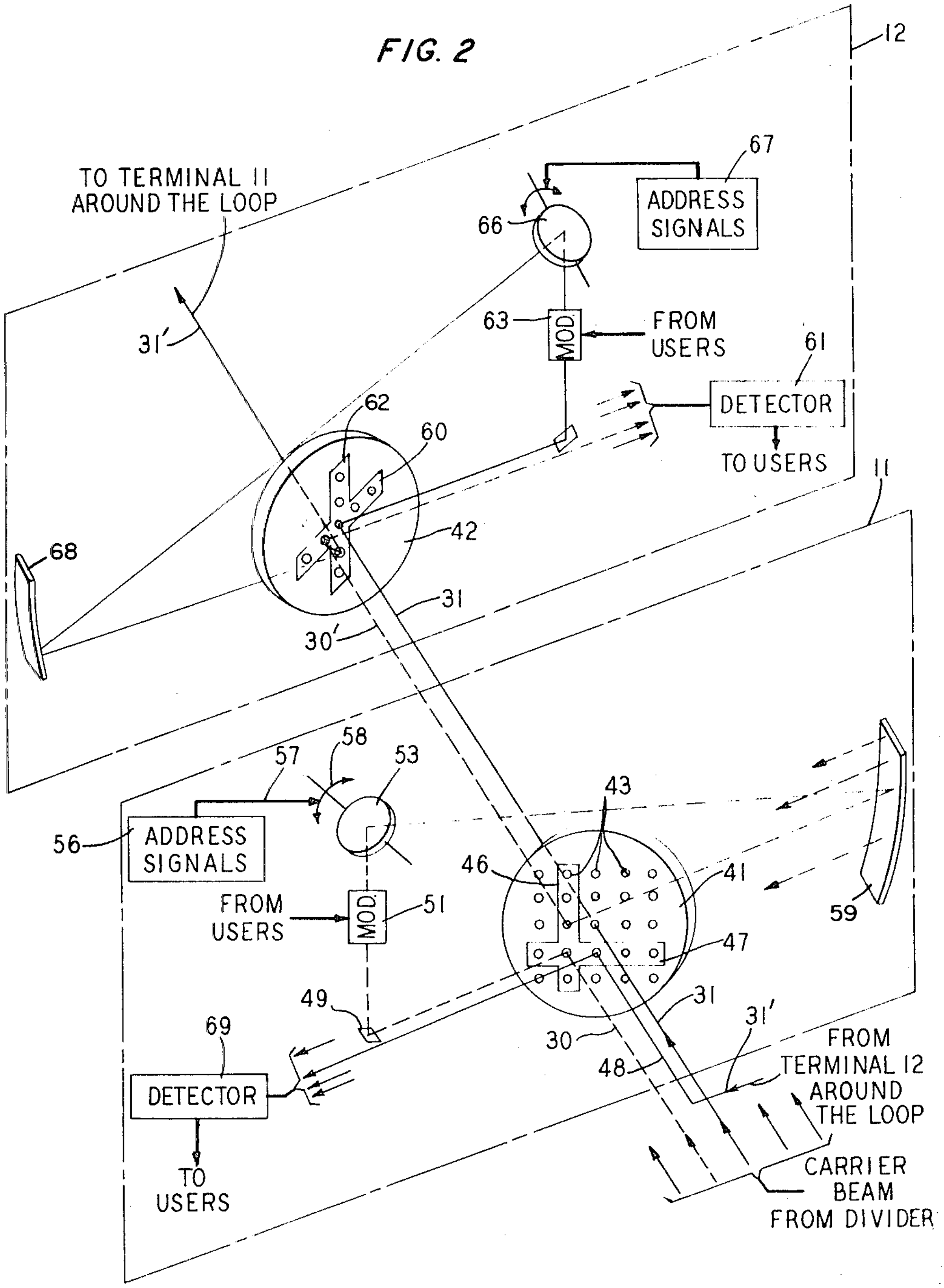
FIG. 2 is a simplified schematic diagram of two of the terminals in the system of FIG. 1.

Shown in FIG. 2 are detailed representations of the loop interface for system users at terminals 11 and 12 of FIG. 1. An important part of this interface in each station is a selective beam deflector such as deflectors 41 in terminal 11 and 42 in terminal 12. The function of such a deflector in each terminal, in connection with communication between terminals 11 and 12, will be described in regard to FIG. 2. It will be understood that similar arrangements are provided at each of the active terminals on loop 18 to permit each such terminal to receive signals from any one or more of the other terminals and simultaneously to transmit signals to any selectable one of the other terminals. This arrangement contemplates the use of multiple detector channels at each terminal and operated on a space, time, or frequency division basis.

The deflector, such as the deflector 41, in each terminal is located transverse to all of the beam paths in the loop 18 and is canted at an angle to those paths for a purpose which will subsequently become apparent. All of the $n \times n$ paths in loop 18 have projections on discrete locations on the deflector 41 so that there are $n$ rows of such locations and $n$ columns of such locations. Any $i^{th}$ terminal around the loop 18 has a reflective coating on the path locations in the $i^{th}$ row and $i^{th}$ column of projected locations on its deflector. The deflector is transparent at all other locations to the beams in loop 18 and is advantageously provided with an antireflection coating on both sides of the deflector, including the reflective coatings just mentioned.

For example, the deflector 41 is a sheet, or disc, of thin window glass on which the projections of the 25 beam path locations are schematically represented by circles such as the circles 43 in FIG. 2. The terminal 11 is the second terminal around loop 18, i.e., $i=2$, from the point of injection of the carrier beams at the mirror 37. Accordingly, strip 46 of reflective coating material is secured to the glass of deflector 41 over the entire extent of the second column of locations from the left. Similarly, another strip 47 of reflective material is deposited over the entire second row of beam locations from the bottom of the deflector 41, as illustrated in FIG. 2.

As previously described in connection with FIG. 1, the carrier beams are incident upon the locations in a diagonal of the array of rows and columns of beam path locations. Accordingly, beam 30 is incident upon the location defined by the intersection of the aforementioned second row and second column of locations on the deflector 41. The remaining beam projection locations on the strip 47 are noncarrier locations, are all in the second row, and are dedicated to the reception of modulated beams from other active terminals on loop 18. Thus, the leftmost location on strip 47 is provided for the exclusive use of modulated beam signals from the first terminal 10 while the third location from the left on strip 47 is provided for the reception of such signals from the third terminal 12. Similarly, the remaining two beam projection locations on the strip 47 are provided for receiving signals from the fourth and fifth terminals 13 and 14 on loop 18. The $n$ beams reflected from strip 47 are the terminal input beams and include one carrier beam 30 and $n-1=4$ modulated beams from other stations. However, in order to preserve the understandability of the drawing, only two input beams to the strip 47 are indicated in FIG. 2, and these are the carrier beam 30 for terminal 11 and a modulated beam 48 from terminal 12.

The carrier beam 30 is reflected by the coating on deflector 41 to a stationary mirror 49 which directs the beam to a modulator 51. At the modulator, input signals from users of the system are modulated onto the carrier beam. Such users may represent telephone subscribers or simply the multitude of communication channels supplied to the modulator 51 from a particular trunk in a central office. Modulated output signals from the modulator 51 are directed to a beam deflector such as the controllably rotatable mirror 53 of a galvanometer mechanism. Address signals are provided within terminal 11 from a source 56 to control the position of the mirror 53 as schematically represented by a circuit 57 which extends from the source 56 to a double-headed arrow 58 associated with the mirror 53 to indicate bidirectional rotational capability for the mirror. The latter mirror is positioned to have its axis of rotation at the focal axis of a cylindrical mirror 59, but at a sufficient angle with respect to that axis so that mirror 59 directs beams from mirror 53 onto the back of strip 46. Mirror 59 is a longitudinal section of a cylinder and redirects divergent output beam paths from mirror 53 into one of $n-1=4$ terminal output beam parallel paths which are directed through the back face of deflector 41 to respective beam locations on the back of reflective strip 46. In the illustrated embodiment, the reflective strips 46 and 47 are deposited upon the front face of the deflector 41 in FIG. 2, and output modulated beams are applied through the glass sheet to be incident upon the back face of the strip 46. Although each terminal deflector has $n \times n$ input paths and $n \times n$ output paths, not all of the paths are used at any one station because the use by beams of the carrier beam input path and the $n-1$ modulated carrier input paths for a particular terminal ends at that terminal. None of those input paths is used again beyond that terminal in the signal transmission direction around loop 18 until the carrier injection point is reached or the output side of one of the $n-1$ other terminals is reached.

In the illustrated embodiment it is assumed that the modulated beam at terminal 11 is to be directed in accordance with address signals from the source 56 to the third loop terminal 12. Accordingly, mirror 53 is positioned to direct the output beam from modulator 51 to the third beam location from the bottom on the back of strip 46. Deflector 41 is so positioned that such modulated beam is then reflected along a parallel path along the loop 18 to the same location on the deflector 42 in terminal 12. It will thus be seen that for communication from a terminal $i$ to a terminal $j$ the modulated beam is applied to the $i,j$ output path, i.e., the $i^{th}$ column and $j^{th}$ row, from the $i^{th}$ terminal deflector in loop 18. That path is unique for the transmission of signals from $i$ to $j$ and is not available to any terminal for any other purpose. It will likewise be seen in the subsequent description that incoming signals to a terminal $i$ from terminal $j$ are received in the beam location $j, i$ of the $i^{th}$ deflector which is reserved exclusively for the transmission of signals from terminal $j$ to terminal $i$.

Now the terminal 12 is considered to be the $j^{th}$ terminal, where $j=3$, and has strips 60 and 62 of reflective coating material on the third row and column of its deflector 42. Terminal 12 is receiving modulated signals from the $i^{th}$ terminal 11 by way of the modulated beam 30', and such beam is reflected from deflector 42 by strip 60 of reflective coating material and thus deflected to an input of a detector 61 in terminal 12. Detector 61 illustratively represents any suitable apparatus for coupling the modulated light beam 30' to the appropriate users taking into account the characteristics of the transmission system provided for reaching those users. Thus, the modulated information may be converted to corresponding electrical signal modulations by apparatus which is well known in the art for transmission to the users coupled to terminal 12.

Terminal 12 is the third station around loop 18, and the intersection of the third row and column is the location on deflector 42 for receiving the carrier beam 31 which is utilized by the terminal 12. The latter beam, which has already passed through deflectors at terminals 10 and 11, is deflected out of the loop 18 and directed by suitable optical arrangements similar to those described in connection with terminal 11 to an input of a modulator 63. User signals are modulated onto the pulsed light beam at modulator 63, and the modulated beam 31' is directed to a mirror 66 in another galvanometric deflection apparatus controllable by address signals from a source 67. Assuming that the latter signals direct the modulated beam 31' to terminal 11, the mirror 66 is positioned to deflect the beam 31' by way of a further cylindrical mirror 68 to the spot on the back of strip 62 which is defined by the intersection of the second row and third column of locations on deflector 42. The modulated beam 31' is thus directed back into the loop 18 and passes around that loop, through intervening terminals as shown in FIG. 1, to reappear at the input side of deflector 41 in terminal 11. Here the beam strikes the corresponding spot in the third column and second row of deflector 41 and is deflected to an input of a detector 69 to make the information available to users coupled to terminal 11. It will thus be seen that any terminal in loop 18 can communicate on a two-way communication basis with any other terminal on the loop in the manner hereinbefore described in connection with the terminals 11 and 12 of FIG. 2. Furthermore, since each beam path in a terminal or in loop 18 is dedicated to a particular function, any terminal can simultaneously transmit to one other terminal and receive from $n-1$ other terminals.

It will be recognized by those skilled in the art that beams traversing a fully transparent spot in a deflector of any one of the terminals, or a beam which is incident upon the outgoing side of a deflector, transverses at least one thickness of the glass base material of the deflector and is, therefore, subject to refractive effects since the deflector is necessarily canted at an angle to the path of the loop 18. At a transmitting terminal the deflector thickness is traversed twice by the outgoing beam and is thus subjected to twice the refraction of a beam making only a single pass through a deflector member. At least a portion of the effect is offset by appropriate adjustment of the positioning of the optical system members within the terminal. Single-pass refraction effects can be limited in various ways. In the illustrated embodiment they are limited by placing deflectors in adjacent terminals in operating positions differing from one another by 90°, i.e., one deflector at 45° counterclockwise from the path of loop 18 (as per deflector 41) and the next at 45° clockwise from the loop path (as per deflector 42) as determined about parallel rotation axes. As long as an even number of terminals is included in loop 18, with alternate deflectors differently turned as just noted, the refraction compensation is maintained. Since the system of FIG. 1 is shown with five active terminals 10–14, the dummy terminal 15 is included to make an even number of terminals. Of course any beam may pass through either an odd or an even number of terminals so the beam path locations on deflectors are spaced to accommodate at least one stage of refraction error.

Although the present invention has been described in connection with a particular embodiment thereof, it is to be understood that modifications and additional embodiments which will be obvious to those skilled in the art are included within the spirit and scope of the invention.

What is claimed is:

1. In combination,
$n \times n$ electromagnetic energy beam paths for providing communication channels, $n$ paths for carrier beams for each of $n$ terminals and $n(n-1)$ paths for communication from each terminal to each other terminal,
means supplying $n$ electromagnetic energy carrier beams to $n$ predetermined ones of said paths,
$n$ beam deflector means, one at each of said terminals, interposed across said $n \times n$ paths for diverting different ones of said carrier beams, respectively, to such terminals,
means at each of said terminals arranged for modulating such deflected carrier beam and diverting the modulated beam back to the deflector means for such terminal,
the latter deflector means including means diverting said modulated carrier beam into a selectable one of $n-1$ of remaining ones of said paths for transmission to another one of said terminals, and
means in each of said deflector means diverting to the corresponding one of said terminals a modulated beam from at least one of the other ones of said terminals.

2. In combination,
$n$ communication terminals each having $n-1$ spatially dedicated incoming communication paths from other terminals, $n-1$ spatially dedicated outgoing communication paths to other terminals, and one electromagnetic energy carrier beam path,
means at each of said terminals arranged for modulating a carrier beam for such terminal, and
means at each of said terminals for deflecting the resulting modulated carrier beam into a selectable one of the $n-1$ outgoing paths for said terminal for each of said other terminals.

3. The combination in accordance with claim 2 in which
means direct beams in said communication paths into parallel paths in a closed loop in which projections of said paths on a cross section of said loop form a rectangular array of rows and columns of beam path locations, and
means couple said carrier beams into said loop in respective additional beam path locations in said array and comprising a diagonal of said array of rows and columns.

4. The combination in accordance with claim 2 in which
an optical beam divider is provided to produce multiple beams in a predetermined pattern in response to an incident beam, said multiple beams comprising said electromagnetic energy carrier beams.

5. The combination in accordance with claim 4 in which
laser means supply a beam of coherent light to an input of said beam divider.

6. The combination in accordance with claim 2 in which
each of said terminals comprises means deflecting said carrier beam for such terminal to an input of said modulation means, and
said modulated carrier beam deflecting means comprises
means for directing output beams from said modulating means to selectable ones of predetermined beam positions,
means controlling said directing means to select one of said positions, and
means intersecting all of said positions for directing said output beams therethrough to predetermined ones of said $n-1$ outgoing paths.

7. The combination in accordance with claim 6 in which
said directing means are galvanometric means.

8. The combination in accordance with claim 6 in which
said means for directing a modulated beam into an outgoing path comprises lens means of cylindrical section format having its concave face toward said deflection means and having its focal point at said deflection means.

9. The combination in accordance with claim 2 which comprises in addition, means providing $n \times n$ beam communication paths in parallel in a closed loop, and selective beam deflector means at each of said terminals directing a carrier beam and incoming modulated beams from said loop to such terminal and directing said outgoing beams from such terminal into said loop in a single predetermined direction therearound.

10. The combination in accordance with claim 9 in which each of said deflector means comprises a member which is transparent to said beams arranged to intersect said loop so that beams in any of said $n \times n$ paths are projected thereon at discrete locations, and beam-reflecting means secured to said member at said locations for the carrier beam for such terminal, the $n-1$ incoming paths, and the $n-1$ outgoing paths.

11. The combination in accordance with claim 10 in which adjacent ones of said deflecting means intersect said loop at angles which differ by 90° to compensate for beam refraction in said members.

12. The combination in accordance with claim 10 in which said member is a glass sheet, said locations are in a rectangular array of $n$ rows and $n$ columns of locations, and said reflecting means comprises a first strip of reflecting material secured to said sheet over the column of locations having a numerical position in said array corresponding to the numerical position of such station along said loop and a second strip of reflecting material secured to said sheet over the row of said locations having a numerical position in said array corresponding to the numerical position of said terminal along said loop.

13. The combination in accordance with claim 12 in which both sides of said glass sheet, with said reflecting means secured thereto, are covered with an antireflective coating.

14. The combination in accordance with claim 4 in which there is provided in addition modulator means for supplying said incident beam, and means for supplying modulating signals to said modulator means for thereby making said modulating signals available to all of said terminals.

15. The combination in accordance with claim 2 in which each of said communication paths and carrier beam path has transmission characteristics of substantially the same frequency band and bandwidth.

16. The combination in accordance with claim 2 in which each of said $n-1$ incoming paths is available for communication from only a different one of said other terminals of said $n$ terminals, respectively, each of said $n-1$ outgoing paths is available for communication to only a different one of said other terminals of said $n$ terminals, respectively, and said one carrier beam path in each terminal is separate from said incoming and outgoing path.

* * * * *